US012567874B2

(12) United States Patent (10) Patent No.: US 12,567,874 B2
Song (45) Date of Patent: Mar. 3, 2026

(54) METHOD AND DEVICE FOR IDENTIFYING VEHICLE THROUGH DATA AND WIRELESS SIGNAL ANALYSIS

(71) Applicant: AXONSIS INC., Seoul (KR)

(72) Inventor: In Eui Song, Seoul (KR)

(73) Assignee: AXONSIS INC., Seoul (KR)

( * ) Notice: Subject to any disclaimer, the term of this patent is extended or adjusted under 35 U.S.C. 154(b) by 106 days.

(21) Appl. No.: 18/576,619

(22) PCT Filed: Jun. 30, 2022

(86) PCT No.: PCT/KR2022/009379
§ 371 (c)(1),
(2) Date: Jan. 4, 2024

(87) PCT Pub. No.: WO2023/282533
PCT Pub. Date: Jan. 12, 2023

(65) Prior Publication Data
US 2024/0333330 A1 Oct. 3, 2024

(30) Foreign Application Priority Data
Jul. 5, 2021 (KR) ........................ 10-2021-0087751

(51) Int. Cl.
H04B 1/3822 (2015.01)
B60C 23/04 (2006.01)
(Continued)

(52) U.S. Cl.
CPC ....... H04B 1/3822 (2013.01); B60C 23/0479 (2013.01); G06V 20/56 (2022.01);
(Continued)

(58) Field of Classification Search
None
See application file for complete search history.

(56) References Cited

U.S. PATENT DOCUMENTS

2016/0232565 A1* 8/2016 Goergen ................ G06Q 10/20
2017/0021760 A1* 1/2017 Calnek ................... B60Q 1/482
2021/0192943 A1* 6/2021 Neff ................ G06Q 10/06311

FOREIGN PATENT DOCUMENTS

JP 2013-175130 A 9/2013
KR 10-2014-0123270 A 10/2014
(Continued)

*Primary Examiner* — Peter D Nolan
*Assistant Examiner* — Michael F Whalen
(74) *Attorney, Agent, or Firm* — Bridgeway IP Law Group, PLLC; Sang Ho Lee; Hyun Woo Shin

(57) ABSTRACT

Provided is a method and device for identifying a vehicle through data and wireless signal analysis, including: a sensor module for recognizing a vehicle; a camera for capturing an image of the exterior of the vehicle; an antenna; a wireless communication unit for receiving, via the antenna, a wireless signal transmitted by a wireless radio wave transmitter mounted or loaded on the vehicle; and a control unit which extracts a first identification value by analyzing sensing data sensed by the sensor module or the image captured using the camera, and which extracts a second identification value by analyzing the wireless signal received by the wireless communication unit, and which identifies the vehicle on the basis of the first identification value and second identification value.

14 Claims, 3 Drawing Sheets

(51) Int. Cl.
  _G06V 20/56_ (2022.01)
  _G06V 20/62_ (2022.01)
  _G08G 1/017_ (2006.01)
(52) U.S. Cl.
  CPC ........ _G06V 20/625_ (2022.01); _G06V 2201/08_
  (2022.01); _G08G 1/017_ (2013.01)

(56) References Cited

FOREIGN PATENT DOCUMENTS

| KR | 10-1512018 | B1 | 4/2015 |
| KR | 10-1613849 | B1 | 4/2016 |
| KR | 10-2017-0077391 | A | 7/2017 |
| KR | 10-2019-0099987 | A | 8/2019 |

* cited by examiner

100

METHOD AND DEVICE FOR IDENTIFYING VEHICLE THROUGH DATA AND WIRELESS SIGNAL ANALYSIS

TECHNICAL FIELD

The present disclosure relates to a vehicle identification method, and more particularly, to a method and device for identifying a vehicle via analysis of data and a wireless signal.

BACKGROUND ART

A license plate of a vehicle is a unique number assigned thereto to distinguish the vehicle from another vehicle, and is used to refer to information such as a type of a vehicle, a manufacturer, a manufacturing year, a use purpose, an exhaust amount, an engine type, an owner, a resident registration area, an non-registered vehicle, a 10-day based driving violating vehicle, a stolen vehicle inquiry, and the like. Therefore, it is very important to quickly and accurately recognize the license plate number even in any vehicle number inquiry environment.

The license plate number recognition technology is a technology for recognizing a license plate number from a license plate, and is applied to a control system of a parking management facility, and is widely used for monitoring entering/exiting vehicle in a non-ticket issuing vehicle entry manner, calculating a parking lot usage fee based on an entry time, etc. and is widely used to control traffic violation such as a lane violation, a signal violation, and a speed violation.

However, the conventional vehicle number recognition technology cannot recognize a front license plate of the vehicle due to snow or rain, dirt throwing, or the like. When a smear phenomenon occurs when sunlight is reflected from a part of the vehicle body at a side angle, or when diffused reflection is generated by the vehicle light at night, the recognition of the vehicle number is very deteriorated.

For example, in order to recognize the license plate number entering the entrance of the parking lot, the vehicle number recognition device takes an image only at a designated position of the entrance of the parking lot or at a site far away from the entrance. Particularly, since the position and brightness of the sunlight and the installation position of the vehicle number recognizer are affected by various shadows, there are many negative effects on the photographed image.

Further, when reflected light is generated, a reflected light (mirror) phenomenon occurs due to an appearance color, a license plate color, or the like of the entering vehicle. Further, an image from which the vehicle number cannot be recognized is captured, due to the influence of a shadow or the like when the backlight is generated.

In addition, due to a change in the surrounding environment due to snow or rain, the license plate of the vehicle may be blocked. The front license plate of the vehicle may not be recognized due to dirt throwing or the like. The smear phenomenon occurs when sunlight is reflected from a part of the entering vehicle body at a side angle, thereby greatly reducing a vehicle number recognition rate. Furthermore, at the night time, the license plate of the vehicle is recognized in a very limited manner due to diffused reflection due to a vehicle light.

In order to solve this problem, Korean Patent Application Publication No. 10-2019-009987 discloses "an unmanned parking management system using vehicle convergence recognition technology".

Briefly, "an unmanned parking management system using a vehicle convergence recognition technology" provides a vehicle convergence recognition technology with improved accuracy by analyzing a beacon tag installed in a vehicle or a Bluetooth signal transmitted from a smartphone of a driver to use the analysis result as vehicle information to be combined with an LPR (license plate recognition) result.

However, in the technology proposed in the above patent document, a wireless communication device such as a near field communication (NFC), a high pass, a beacon, and a radio wave transmitter should be separately attached to the vehicle for vehicle management.

PRIOR ART DOCUMENT (Patent Document 1) Korean Patent Application Publication No. 10-2019-0099987

Disclosure

Technical Problem

A purpose of the present disclosure is to provide a method and a device for identifying a vehicle through data and wireless signal analysis which lower a vehicle recognition error frequently occurring due to various external factors such as snow or rain, foreign substances, license plate changes, new standard size introduction, and custom license plates.

Another purpose of the present disclosure is to provide a method and a device for identifying a vehicle through data and wireless signal analysis capable of recognizing a vehicle by using a communication device attached to a vehicle when the vehicle is released, and a communication device carried by a driver.

Technical Solution

According to one embodiment of the present disclosure in order to achieve the above purpose, a vehicle identification device via data and wireless signal analysis includes a sensor module configured to recognize a vehicle; a camera configured to capture an appearance of the vehicle; an antenna; a wireless communication unit configured to receive, through the antenna, a wireless signal transmitted from a wireless radio wave transmitter installed or mounted on the vehicle; and a control unit configured to: extract a first identification value by analyzing sensed data sensed by the sensor module or an image captured using the camera; extract a second identification value by analyzing the wireless signal received by the wireless communication unit; and identify the vehicle based on the first identification value and the second identification value.

Preferably, the sensor module is configured to transmit a radio wave to the vehicle, detect change in the radio wave reflected from the vehicle, and recognize the vehicle based on the change.

Preferably, the sensor module includes at least one of a magnetometer sensor, a loop coil sensor, an ultrasonic sensor, a microwave sensor, a radar sensor, a lidar sensor, an optical blocking type sensor, and a grid type sensor.

Preferably, the control unit is configured to compare a previously captured image and a currently captured image using the camera with each other, to determine a size, an area, a color, and a specific shape of a change in the image based on the comparing result, and to recognize the vehicle based on the determination result.

Preferably, the sensor module is configured to transmit visible light and infrared light toward the vehicle, to detect deformation including a bending, a gap, and a size of a shape (a point, a line, and a shape) of a shadow generated thereby and the transmitting light, and to recognize the vehicle based on the detection result.

Preferably, the control unit is configured to recognize an object from an image captured by the camera via an artificial intelligence processing unit built in the camera, and to recognize the vehicle based on the recognizing result.

Preferably, an appearance of the vehicle includes at least one of an exterior color, an interior color, a black box appearance, a headlight design, a taillight design, an emergency light flickering interval, a glass production year, a wheel design, a grill design, and a vehicle emblem.

According to another embodiment of the present disclosure in order to achieve the above purpose, a vehicle identification method via data and wireless signal analysis includes recognizing, by a vehicle identification device, a vehicle, or imaging, by the vehicle identification device, an appearance of the vehicle; analyzing, by the vehicle identification device, sensed data or a captured image to extract a first identification value; receiving, by the vehicle identification device, a wireless signal transmitted from a wireless radio wave transmitter installed or mounted on the vehicle; analyzing, by the vehicle identification device, the wireless signal to extract a second identification value; and identifying, by the vehicle identification device, the vehicle based on the first identification value and the second identification value.

Preferably, recognizing, by the vehicle identification device, the vehicle includes transmitting, by the vehicle identification device, a radio wave to the vehicle, detecting, by the vehicle identification device, change in the radio wave reflected from the vehicle, and recognizing, by the vehicle identification device, the vehicle based on the change.

Preferably, recognizing, by the vehicle identification device, the vehicle includes comparing, by the vehicle identification device, a previously captured image and a currently captured image with each other, determining, by the vehicle identification device, a size, an area, a color, and a specific shape of a change in the image based on the comparing result, and recognizing, by the vehicle identification device, the vehicle based on the determination result.

Preferably, recognizing, by the vehicle identification device, the vehicle includes transmitting, by the vehicle identification device, visible light and infrared light toward the vehicle, detecting, by the vehicle identification device, deformation including a bending, a gap, and a size of a shape (a point, a line, and a shape) of a shadow generated thereby and the transmitting light, and recognizing, by the vehicle identification device, the vehicle based on the detection result.

Preferably, receiving, by the vehicle identification device, the wireless signal includes: transmitting, by the vehicle identification device, a wake-up signal for waking up the wireless communication device to the wireless communication device; and receiving, by the vehicle identification device, the wireless signal in response to the wake-up signal from the wireless communication device.

Preferably, receiving, by the vehicle identification device, the wireless signal includes receiving, by the vehicle identification device, the wireless signal broadcasted from the wireless communication device.

Preferably, receiving, by the vehicle identification device, the wireless signal includes: broadcasting, by the vehicle identification device, a signal for communication; and receiving, by the vehicle identification device, probe information as the wireless signal in response to the broadcast signal.

Technical Effect

As described above, according to the present disclosure, the vehicle identification device and method via data and wireless signal analysis which extracts the first identification value by analyzing the sensed data sensed by the sensor module or the image captured using the camera; extracts the second identification value by analyzing the wireless signal received by the wireless communication unit; and identify the vehicle based on the first identification value and the second identification value are provided, thereby reducing the vehicle recognition error that frequently occurs due to various external factors such as snow or rain, foreign substances, license plate changes, new standard size introduction, and custom license plates.

In addition, for vehicle management, a separate wireless communication device such as a near field communication (NFC), a Hi-Pass, a beacon, and a radio wave transmitter is not required.

BEST MODE

Figure 1:
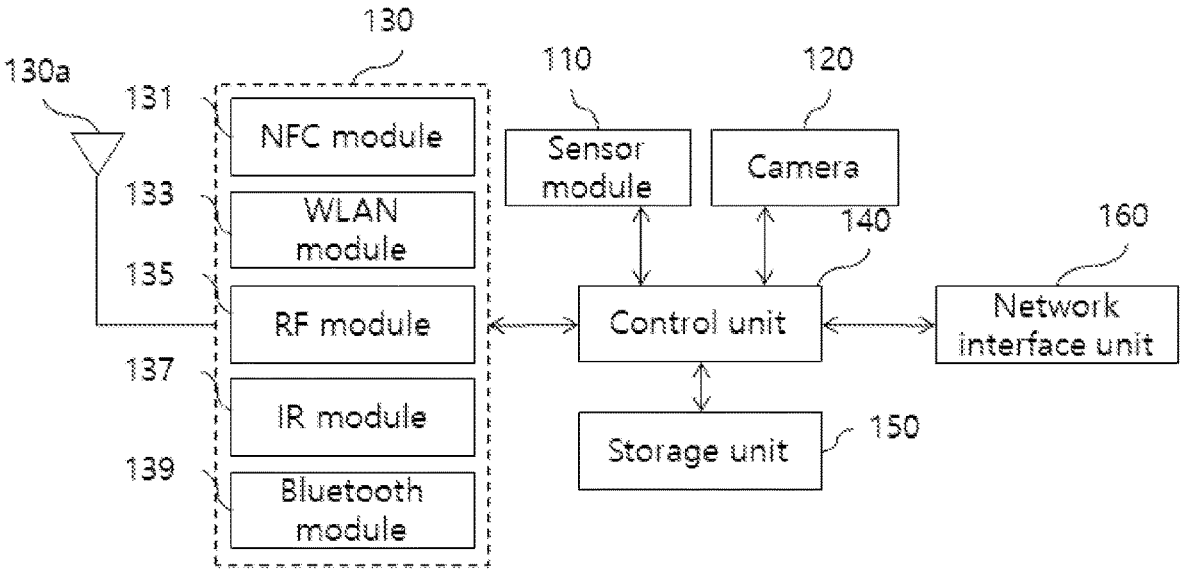
FIG. 1 is a block diagram illustrating a schematic internal configuration of a vehicle identification device through data and wireless signal analysis according to an embodiment of the present disclosure.

It should be noted that the technical terms used herein are used only to describe particular embodiments, and are not intended to limit the present disclosure. In addition, the technical terms used in the present disclosure are to be interpreted as having meanings understood by those skilled in the art to which the present disclosure pertains, unless otherwise defined in the specification, and should not be construed as an excessively comprehensive meaning or an excessively reduced meaning. In addition, when the technical terms used in the present disclosure are wrong technical terms that do not accurately express the spirit of the present disclosure, it should be understood by those skilled in the art that the technical terms are replaced by technical terms that may be correctly understood by one of ordinary skill in the art. In addition, the general terms used in the present disclosure should be interpreted as being defined in advance, or in accordance with the context thereof, and should not be interpreted in an excessively reduced meaning.

In addition, as used herein, the singular constitutes "a" and "an" are intended to include the plural constitutes as well, unless the context clearly indicates otherwise. In the present disclosure, the terms "include" or "comprise" should not be construed as necessarily including all of the elements or steps described in the specification, and should be construed as not including some of the elements or steps, or as further including additional elements or steps.

In addition, the suffixes "module" and "unit" for the components used in the present disclosure are given in consideration of only the ease of writing the description, and are used interchangeably with each other and do not have meanings or roles that are distinguished from each other by itself.

In addition, terms including ordinal numbers such as first, second, etc. used herein may be used to describe various components, but the components should not be limited by the terms. The terms are used only for the purpose of distinguishing one component from another component. For example, a first element could be termed a second element, and, similarly, a second element could be termed a first element, without departing from the scope of the present disclosure.

| [Reference numerals] | |
|---|---|
| 110: Sensor module | 120: Camera |
| 130a: Antenna | 130: Wireless communication unit |
| 131: NFC module | 133: WLAN module |
| 135: RF module | 137: IR module |
| 139: Bluetooth module | 140: Control unit |
| 150: Storage unit | 160: Network interface unit |

MODE

Hereinafter, preferred embodiments of the present disclosure will be described in detail with reference to the accompanying drawings, in which like reference numerals refer to like or similar elements regardless of the reference numerals, and repeated descriptions thereof will be omitted.

Further, in the following description of the present disclosure, a detailed description of known related technologies may be omitted when it is determined that the description may make the gist of the present disclosure unclear. It should be noted that the accompanying drawings are used to easily understand the spirit of the present disclosure, and the spirit of the present disclosure should not be construed as being limited by the accompanying drawings.

FIG. 1 is a block diagram illustrating an internal schematic configuration of a vehicle identification device through analysis of data and wireless signals according to an embodiment of the present disclosure.

Referring to FIG. 1, a vehicle identification device 100 according to the present disclosure may include a sensor module 110, a camera 120, an antenna 130a, a wireless communication unit 130, a control unit 140, a storage unit 150, and a network interface unit 160.

The sensor module 110 may include various types of detection sensors for sensing movement and change in a space in passive and active manners.

First, the sensor module 110 may transmit a radio wave to the vehicle and detecting change in the radio wave reflected therefrom, and recognize an object based on the detected change. To this end, the sensor module 110 may include a magnetometer sensor, a loop coil sensor, an ultrasonic sensor, a microwave sensor, a radar sensor, a lidar sensor, an optical blocking type sensor, and a grid type sensor.

Second, the sensor module 110 may compare a previously captured image and a currently captured image with each other, and sense a size, a region, a color, and a specific shape of the change in the image based on the comparing result, and recognize the vehicle based on the sensing result. To this end, the camera 120 may replace the sensor module 110.

Third, the sensor module 110 may transmit visible light and infrared light to the vehicle, and detect deformation including a bending, a gap, and a size of a shape (point, line, and shape) of the thus generated shadow and transmitting light, and recognize the vehicle based on the detection result. In this regard, the sensor module 110 may be used to identify whether the object is a vehicle, the vehicle type, and identify a person, an animal, and various objects other than the vehicle.

The camera 120 captures an image. In this regard, the camera 120 may include an artificial intelligence processing unit embedded therein to recognize an object. That is, the camera 120 is merged into or directly connected to an image signal processor (ISP) and a digital signal processor (DSP) in the image sensor before the storage unit 150 and is configured to recognize an object through an AI chip, that is, an artificial intelligence processing process. The camera 120 may process the image without a storage process thereof.

The antenna 130a receives a wireless signal transmitted from a wireless communication device (for example, a Transmission Control Unit (TCU), a car audio, and a mobile phone) installed or mounted on a vehicle for a wireless communication connection, or receives various information transmitted from the vehicle identification device 100, and transmits the received information to the outside. In this regard, the wireless signal may be a signal generated from a tire pressure monitoring system (TPMS) (315/433/447 MHz band) of a vehicle, a radar sensor (20 GHz to 90 GHz), a Wi-Fi (2.4/5.8 GHZ), and other wireless communication devices (100 KHz to 630 GHz).

In addition, the antenna 130a may receive not only the wireless signal for communication transmitted from the wireless communication device, but also other wireless signals. For example, a wireless signal transmitted from a radar among sensors used for autonomous driving and received by the antenna may include unique information of a vehicle transmitting the signal in order to prevent confusion between types of vehicles. This signal is not intended for simple communication but is a wireless signal for preventing confusion between the types of the vehicles. As in this example, the antenna of the present disclosure may receive not only the wireless signal for communication purposes but also a wireless signal generated for other purposes. The wireless communication unit, the control unit, and the like, which will be described later, may process such wireless signals.

The antenna 130a is an antenna system having directivity only in a specific direction so as to acquire information only about a vehicle passing through the gate. A broadband antenna system to acquire various frequency information may be applied as the antenna system.

The TPMS may also be referred to as a tire pressure automatic detection system, a tire pressure detection system, and a tire pressure monitoring system. When the air pressure of a tire of a vehicle is too high or low, the tire may be flat, or the vehicle may be easily slipped to lead to a large accident. In addition, fuel consumption is increased, such that the fuel efficiency is deteriorated, the lifespan of the tire is shortened, and the ride comfort and the braking power are also deteriorated.

A safety device mounted on the vehicle to prevent a defect of the tire is TPMS. The TPMS is a sensor attached to a tire and a wheel, and is designed to detect the pressure and temperature of the tire and then transmit the detected information to a driver's seat to check the pressure state of the tire in real time based the information. Using the system may improve durability of the tire, ride comfort, braking force, and fuel efficiency, and may prevent the vehicle body from being severely shaken during driving.

The wireless communication unit 130 transmits and receives the wireless signal to and from any one of a wireless communication device and a RF frequency transmission sensor installed or mounted on the vehicle through the antenna 130*a*. To this end, the wireless communication unit 130 includes an NFC module 131 capable of transmitting and receiving the wireless signal to and from the wireless communication device according to a near field communication (NFC) standard, a WLAN module 133 capable of transmitting and receiving the wireless signal to and from the wireless communication device according to a WLAN (wireless LAN) communication standard, an RF module 135 capable of transmitting and receiving the wireless signal to and from the wireless communication device according to an RF communication standard, an IR module 137 capable of transmitting and receiving the wireless signal to and from the wireless communication device according to an IR communication standard, and a Bluetooth module 139 capable of transmitting and receiving the wireless signal to and from the wireless communication device according to a Bluetooth communication standard.

The control unit 140 typically controls all operations of the vehicle identification device 100. The control unit 140 may provide or process information or functions appropriate for the user by processing the signals, data, information, and the like, which are input or output through the above-described components, or executing application programs stored in the storage unit 150.

In addition, the control unit 140 may control at least some of the components illustrated in FIG. 1 to execute the application program stored in the storage unit 150. Furthermore, the control unit 140 may operate a combination of at least two of the components included in the vehicle identification device 100 to execute the application program.

In one example, instead of an existing local server, the control unit 140 according to the present disclosure stores the sensed data sensed by the sensor module 110, the image captured using the camera 120, and the wireless signal received through the wireless communication unit 130 in the storage unit 150, extracts a first identification value by analyzing the sensed data or the image stored in the storage unit 150, and extracts a second identification value by analyzing the wireless signal stored in the storage unit 150, and identifies the vehicle based on the first identification value and the second identification value. In this regard, the first identification value may include a vehicle number, a license plate, an appearance of the vehicle, a vehicle type, and the like. The appearance of the vehicle may include an exterior color, an interior color, a black box appearance, a headlight design, a taillight design, an emergency light flickering interval, a glass production year, a wheel design, a grill design, a vehicle emblem, and the like. In addition, the second identification value may include a waveform of the wireless signal, various information included in data of the wireless signal (e.g. International Mobile Equipment Identity (IMEI), a Unique Device Identifier (UDID), an Advertisement Identifier (IDFA/ADID), an Android ID, an Apple UUID signal), and a MAC Address.

That is, the control unit 140 may recognize the vehicle number as the first identification value from the image by using an optical character reader (OCR).

The control unit 140 may recognize the vehicle number as the first identification value based on artificial intelligence (AI). That is, the control unit 140 may recognize the license plate number from the image by using a multi-scale convolutional neural network (MCNN) and a recurrent neural network (RNN) technique. For example, the control unit 140 may detect the vehicle, pre-process the image through image quality improvement, color improvement, noise improvement, image conversion, and variable threshold parallel processing, extract the license plate through edge detection, partial inference, and feature vector extraction, blob-extract numbers from the extracted license plate, and then recognize the vehicle number through matching recognition, AI (unsupervised, semi-supervised and reinforcement learning) recognition, rate processing, and voting process, etc.

The control unit 140 may recognize a license plate object as the first identification value from the image based on artificial intelligence. That is, the control unit 140 may recognize the license plate object by applying a grid scheme to an object selection method. For example, the control unit 130 may recognize the license plate object by extracting a license plate area of the entering or exiting vehicle, classifying information (for example, a vehicle number and a country region) in the license plate, and analyzing a form and content of the license plate. In this case, since the control unit 140 uses the image, the control unit 140 can distinguish color difference of the license plate. As described above, the control unit 140 may apply the grid scheme to the object selection method in order to compensate for the disadvantages of the object detection technique commonly used for the license plate object recognition using artificial intelligence, thereby improving a floating-point arithmetic operation and thus optimizing an operation speed.

The control unit 140 may recognize the appearance of the vehicle as the first identification value from the image based on artificial intelligence. That is, the control unit 140 may recognize the appearance of the vehicle by applying the grid scheme to the object selection method. For example, the control unit 140 may analyze the appearance of the vehicle by analyzing the design of the front part (except for the license plate), the design of the rear part, and features of various attachments of the entering or exiting vehicle, and classifying a vehicle manufacturer, a vehicle type, a vehicle manufacturing year, an engine displacement, etc. based on the analyzing result.

The control unit 140 may recognize the vehicle type as the first identification value using the appearance of the vehicle based on the artificial intelligence. That is, the control unit 140 may recognize the vehicle type based on object recognition using a reinforcement learning function.

When an artificial intelligence processing process is embedded in the camera 120, the above-described operation of the control unit 140 may be performed by the camera 120.

Further, the control unit 140 may extract the waveform of the wireless signal as the second identification value from the wireless signal.

To this end, the control unit 140 may transmit, to the wireless communication device, a wake-up signal for waking up the wireless communication device through the wireless communication unit 130, and receive the wireless signal in response to the wake-up signal from the wireless communication device. In addition, the control unit 140 may receive the wireless signal broadcasted by the wireless communication device through the wireless communication unit 130. In addition, the control unit 140 may broadcast a signal for communication through the wireless communication unit 130, and may receive probe information as the wireless signal in response to the broadcasted signal.

The control unit 140 may analyze the data included in the wireless signal and extract at least one piece of information as the second identification value from the data.

The control unit 140 may extract the MAC address as the second identification value from the wireless signal. In this regard, the control unit 140 may receive a plurality of wireless signals from a plurality of wireless communication devices, respectively, and may integrate some of the respective MAC addresses of the plurality of wireless communication devices with each other to generate an identification value. More specifically, since some of the respective MAC addresses of the wireless communication devices are integrated with each other to generate a separate identification value provided only according to the present disclosure, personal privacy invasion and the like that may occur when receiving and storing a MAC address value of a specific wireless communication device may be prevented. In one example, the wireless signal may be a signal generated from the TPMS of the vehicle. To this end, the control unit 140 may use a wake-up function of waking up the TPMS. In addition, the control unit 140 may generate the identification value by integrating some of IDs of four TPMSs respectively mounted on four tires of the vehicle with each other.

In addition, the control unit 140 does not identify the vehicle even using the first identification value and the second identification value. In this case, the driver may press a specific button (for example, a function button including a door lock release, a door lock, a trunk locking or unlocking, etc.) of a vehicle remote controller at various times such as 1 or 2 consecutive times to generate a signal, and the control unit 140 may recognize the signal to identify the vehicle.

The storage unit 150 may store therein the sensed data sensed by the sensor module 110, the image captured by the camera 120, and the wireless signal received through the wireless communication unit 130. When the artificial intelligence processing process is embedded in the camera 120, the storage unit 150 may be omitted.

In addition, the storage unit 150 stores therein data supporting various functions of the vehicle identification device 100. The storage unit 150 may store therein the application programs executed in the vehicle identification device 100, data or instructions for operations of the vehicle identification device 100, and the like. Some of these application programs may be downloaded from an external server via wireless communication. The application program may be stored in the storage unit 150, installed on the vehicle identification device 100, and executed by the control unit 140 to perform an operation (or function) of the device.

The network interface unit 160 may provide an interface for connecting the vehicle identification device 100 to a wired/wireless network including an Internet network. The network interface unit 160 may transmit or receive data to or from another user or another electronic device through a connected network or another network linked to the connected network. For example, the vehicle identification device 100 may be connected to a manager terminal, a vehicle entry/exit management server, and a vehicle parking management server through the network interface unit 160 and transmit and receive data thereto and therefrom.

Figure 2:
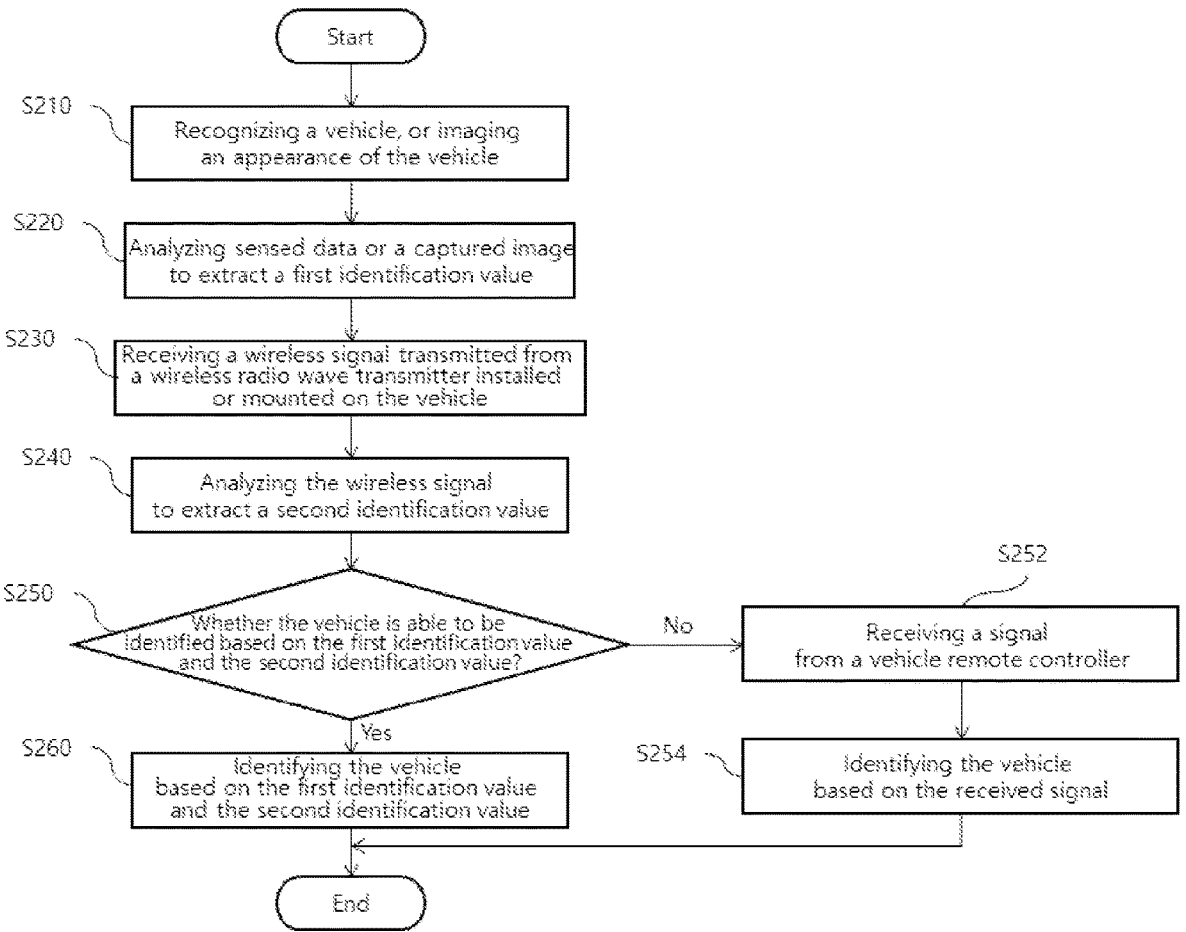
FIG. 2 is a flowchart illustrating a vehicle identification method through analysis of data and wireless signals according to an embodiment of the present disclosure.

FIG. 2 is a flowchart illustrating a vehicle identification method using data and wireless signal analysis according to an embodiment of the present disclosure.

Referring to FIG. 2, the vehicle identification device 100 recognizes a vehicle or captures an external appearance of the vehicle in S210. In this regard, the vehicle identification device 100 may transmit a radio wave to the vehicle and detecting change in the radio wave reflected therefrom, and recognize an object based on the detected change. In addition, the vehicle identification device 100 may compare a previously captured image and a currently captured image with each other, and sense a size, a region, a color, and a specific shape of the change in the image based on the comparing result, and recognize the vehicle based on the sensing result. In addition, the vehicle identification device 100 may transmit visible light and infrared light to the vehicle, and detect deformation including a bending, a gap, and a size of a shape (point, line, and shape) of the thus generated shadow and transmitting light, and recognize the vehicle based on the detection result. In addition, the vehicle identification device 100 may recognize an object from an image captured by the camera 120 via an artificial intelligence processing unit built in the camera 120, and to recognize the vehicle based on the recognizing result.

The vehicle identification device 100 extracts the first identification value by analyzing the sensed data or the captured image in S220.

That is, the vehicle identification device 100 may recognize the vehicle number as the first identification value from the image using the OCR.

In addition, the vehicle identification device 100 may recognize the vehicle number as the first identification value from the image based on artificial intelligence. That is, the vehicle identification device 100 may recognize the vehicle number from the image by using the MCNN and the RNN technique. For example, the vehicle identification device 100 may detect the vehicle, pre-process the image through image quality improvement, color improvement, noise improvement, image conversion, and variable threshold parallel processing, extract the license plate through edge detection, partial inference, and feature vector extraction, blob-extract numbers from the extracted license plate, and then recognize the vehicle number through matching recognition, AI (unsupervised, semi-supervised and reinforcement learning) recognition, rate processing, and voting process, etc.

Further, the vehicle identification device 100 may recognize the license plate object as the first identification value from an image based on artificial intelligence. That is, the vehicle identification device 100 may recognize the license plate object by applying the grid scheme to the object selection method. For example, the vehicle identification device 100 may recognize the license plate object by extracting a license plate area of the entering or exiting vehicle, classifying information (for example, a vehicle number and a country region) in the license plate, and analyzing a form and content of the license plate. In this case, the vehicle identification device 100 may distinguish a license plate color difference using an infrared image.

In addition, the vehicle identification device 100 may recognize the appearance of the vehicle as the first identification value from the image based on artificial intelligence. That is, the vehicle identification device 100 may recognize the appearance of the vehicle by applying the grid scheme to the object selection method. For example, the vehicle identification device 100 may recognize the appearance of the vehicle by analyzing the design of the front part (except for the license plate), the design of the rear part, and features of various attachments of the entering or exiting vehicle, and classifying a vehicle manufacturer, a vehicle type, a vehicle manufacturing year, an engine displacement, etc. based on the analyzing result.

In addition, the vehicle identification device 100 may recognize the vehicle type as the first identification value using the appearance of the vehicle based on artificial intelligence. That is, the vehicle identification device 100 may recognize the vehicle type via the object recognition using a reinforcement learning function.

Next, the vehicle identification device 100 may receive the wireless signal transmitted from the wireless communication device installed or mounted on the vehicle in S230. In this regard, the vehicle identification device 100 may transmit, to the wireless communication device, a wake-up signal for waking up the wireless communication device through the wireless communication unit 130, and receive the wireless signal in response to the wake-up signal from the wireless communication device. In addition, the vehicle identification device 100 may receive the wireless signal broadcasted by the wireless communication device through the wireless communication unit 130. In addition, the vehicle identification device 100 may broadcast a signal for communication through the wireless communication unit 130, and may receive probe information as the wireless signal in response to the broadcasted signal.

Subsequently, the vehicle identification device 100 extracts the second identification value by analyzing the wireless signal in S240.

That is, the vehicle identification device 100 may extract the waveform of the wireless signal as the second identification value from the wireless signal.

Further, the vehicle identification device 100 may analyze the data included in the wireless signal and extract at least one piece of information as the second identification value from the data.

Further, the vehicle identification device 100 may extract the MAC address as the second identification value from the wireless signal. In this regard, the vehicle identification device 100 may receive a plurality of wireless signals from a plurality of wireless communication devices, respectively, and may integrate some of the respective MAC addresses of the plurality of wireless communication devices with each other to generate an identification value.

In one example, the wireless signal may be a signal generated from the TPMS of the vehicle. To this end, the vehicle identification device 100 may use a wake-up function of waking up the TPMS. In addition, the vehicle identification device 100 may generate the identification value by integrating some of IDs of four TPMSs respectively mounted on four tires of the vehicle with each other.

Subsequently, the vehicle identification device 100 determines whether the vehicle is able to be identified, based on the first identification value and the second identification value in S250. When it is determined that the vehicle is able to be identified based on the first identification value and the second identification value, the vehicle identification device 100 may identify the vehicle based on the first identification value and the second identification value in S260.

When it is determined that the vehicle is not able to be identified based on the first identification value and the second identification value, the vehicle identification device 100 receives a signal from the vehicle remote controller in S252, and identifies the vehicle based on the received signal in S254. For example, the driver may press a specific button (for example, a function button including a door lock release, a door lock, a trunk locking or unlocking, etc.) of the vehicle remote controller at various times such as 1 or 2 consecutive times to generate a signal. Then, the vehicle identification device 100 may recognize the signal to identify the vehicle.

The above-described method may be implemented through various means. For example, the embodiments of the present disclosure may be implemented by hardware, firmware, software, or a combination thereof.

When the method is implemented using the hardware, the method according to embodiments of the present disclosure may be implemented using at least one of Application Specific Integrated Circuits (ASICs), Digital National Signal Processors (DSPs), Digital Chirp Processing Devices (DSPDs), Programmable Logic Devices (PLDs), Field Programmable Gate Arrays (FPGAs), Image Signal Processors (ISPs), Graphics Processing Units (GPUs), Neural Processing Units (NPUs), a processor, a control unit, a microcontroller, a microprocessor, or the like.

When the method is implemented using firmware or software, the method according to embodiments of the present disclosure may be implemented in a form of a module, a procedure, or a function for performing the functions or operations described above. A software code may be stored in a memory unit and may be executed by a processor. The memory unit may be located inside or outside the processor, and may exchange data with the processor via various means already known.

Figure 3:
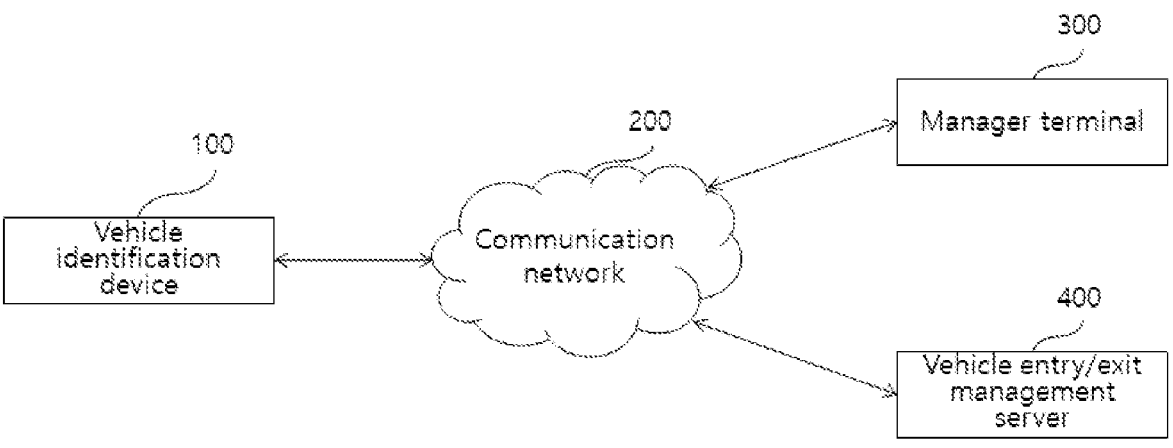
FIG. 3 is a diagram illustrating a configuration of an entry/exit management system to which a vehicle identification device according to an embodiment of the present disclosure is applied.

FIG. 3 is a diagram illustrating a configuration of a vehicle entry/exit management system to which the vehicle identification device according to an embodiment of the present disclosure is applied.

Referring to FIG. 3, the vehicle entry/exit management system according to the present disclosure may include the vehicle identification device 100, a communication network 200, a manager terminal 300, and a vehicle entry/exit management server 400. In this regard, the vehicle identification device 100 may be included in the vehicle entry/exit management server 400.

As described with reference to FIG. 1, the vehicle identification device 100 includes the sensor module 110, the camera 120, the antenna 130a, the wireless communication unit 130, the control unit 140, the storage unit 150, and the network interface unit 160. The vehicle identification device 100 may extract the first identification value by analyzing the sensed data sensed by the sensor module 110 or the image captured using the camera 120, and may extract the second identification value by analyzing the wireless signal received through the wireless communication unit 130, and may identify the vehicle based on the first identification value and the second identification value.

The communication network 200 may provide a connection path through which data may be transmitted and received between the vehicle identification device 100, the manager terminal 300, and the entry/exit management server 400, and may include a wired/wireless communication module. The wireless Internet technology may include a Wireless Local Area Network (WLAN), a Wi-Fi, a Wireless Broadband (WiBro), World Interoperability Law for Microwave Access Law (WiMAX), High Speed Downlink Packet Access (HSDPA), IEEE 802.16, Wireless Access in Vehicular Environment (WAVE), IEEE 802.11P, C-V2X (Cellular-V2X), 5G-V2X, Long Term Evolution (LTE), Wireless Mobile Broadband Service (WMBS), Light Fidelity, and the like. The Short Range Communication technology may include Bluetooth, Radio frequency identification (RFID), Infrared Data Association (RCC), Ultra Wideband (UWB), ZigBee, Dedicated Short Range Communication (DSRC), and the like. The wired communication technology may include Universal Serial Bus (USB) communication.

The manager terminal 300 may allow the vehicle identification device 100 to re-train the module through a cloud server according to misrecognition of the license plate of the vehicle identification device 100, thereby increasing the accuracy of the license plate recognition.

The manager terminal 300 as described herein may include a mobile phone, a smart phone, a laptop computer, a digital broadcasting terminal, a personal digital assistant (PDA), a portable multimedia player (PMP), a navigation device, a slate PC, a tablet PC, an ultra-book, and a wearable device, for example, a smart watch, a smart glass, a head mounted display (HMD), and the like.

However, it will be readily apparent to those skilled in the art that the configuration according to the embodiment as described herein may also be applied to a fixed terminal such as a digital TV, a desktop computer, a digital signage, and the like, except for a case in which the configuration is applicable only to a mobile terminal.

The entry/exit management server 400 recognizes the appearance of the vehicle through the vehicle identification device 100. When the vehicle has an appearance of which the vehicle (such as a vehicle of a resident or a vehicle of a manager) for is permitted to enter and exit, the entry/exit management server 400 controls access control means to allow the vehicle to enter and exit. In this regard, the access control means refers to a blocking apparatus having a transverse bar or a longitudinal bar pivoting in a vertical direction.

There may be a need for vehicles other than those authorized to enter (e.g., visitor vehicles, delivery vehicles, etc.) to enter. Even when the vehicle's license plate or appearance cannot be recognized due to damage or other reasons, entry must be permitted. In this case, the car entry/exit management system according to the present disclosure may include an access request terminal through which a visitor may call a person in a place to visit or a manager, and an in-house control terminal that receives video information of the entering or exiting vehicle from the vehicle identification device 100.

That is, a vehicle that is not allowed to access may request access permission to a residential person in a place to visit or a parking lot manager. In addition, when the number plate or the appearance of the vehicle of the resident is not normally recognized, the resident may input an identifier thereof and a password into the access request terminal to get access grant. In this regard, the in-house control terminal is included in the home network, and the configuration of the home network is variously applied according to the needs of those skilled in the art.

Figure 4:
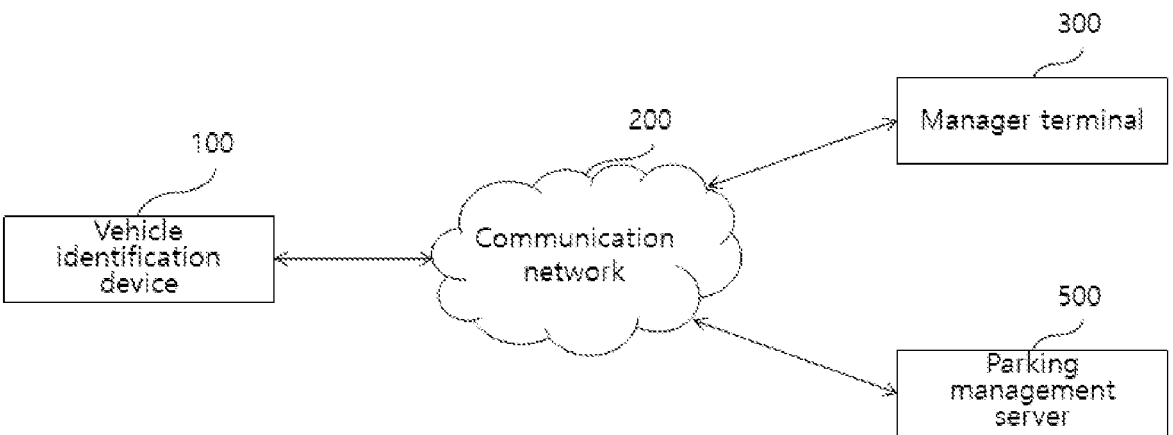
FIG. 4 is a diagram illustrating a configuration of a parking management system to which a vehicle identification device according to an embodiment of the present disclosure is applied.

FIG. 4 is a diagram illustrating a configuration of a parking management system to which the vehicle identification device according to an embodiment of the present disclosure is applied.

Referring to FIG. 4, the parking management system according to the present disclosure may include the vehicle identification device 100, the communication network 200, the manager terminal 300, and a parking management server 500. In the following description, descriptions about the same elements as those of the vehicle entry/exit management system of FIG. 3 will be omitted.

When the driver presses a specific button of the vehicle remote controller at the parking position, the parking management server 500 may receive the signal generated from the vehicle remote controller through the antenna, determine a direction and a distance from the antenna, that is, spatial coordinates, and display the position of the vehicle in association with the parking lot structure (map). To this end, the parking management server 500 may include several antennas or beamforming antennas.

The parking management server 500 may receive a signal generated for communication with a smart key from the vehicle, identify a direction and a distance from the antenna, that is, spatial coordinates, and display the location of the vehicle in association with the structure or the map of the parking lot. To this end, the parking management server 500 may include several antennas or beamforming antennas.

The embodiments as disclosed herein have been described with reference to the accompanying drawings. As described above, the embodiments illustrated in the drawings are not to be construed as limiting, and may be combined with each other by those skilled in the art having known the contents of the present disclosure. When the embodiments are combined with each other, some components may be interpreted as being omitted.

Herein, terms or words used in the present disclosure and claims should not be construed as being limited to ordinary or dictionary meanings, and should be interpreted as having a meaning and a concept consistent with the technical spirit disclosed in the present disclosure.

Therefore, the embodiments disclosed in the present disclosure and the configurations shown in the drawings are merely exemplary embodiments disclosed herein, and do not include all of the technical ideas disclosed in the present disclosure, and thus, it should be understood that various equivalents and modifications may be made to replace them at the time of filling the present application.

INDUSTRIAL APPLICABILITY

The device and method according to the present disclosure may be used for accurately recognizing vehicles in various environments including parking lots for managing the vehicles. In addition, the industrial applicability of the present disclosure is not limited to the above description.

The invention claimed is:

1. A vehicle identification device via data and wireless signal analysis, the vehicle identification device comprising:
   a sensor module configured to recognize a vehicle;
   a camera configured to capture an appearance of the vehicle;
   an antenna;
   a wireless communication unit configured to receive, through the antenna, a wireless signal transmitted from a wireless radio wave transmitter installed or mounted on the vehicle; and
   a control unit configured to:
   extract a first identification value by analyzing sensed data sensed by the sensor module or an image captured using the camera;
   extract a second identification value by analyzing the wireless signal received by the wireless communication unit; and
   identify the vehicle based on the first identification value and the second identification value,
   wherein the first identification value is at least one of vehicle number, a license plate, an appearance of the vehicle and a vehicle type,
   the second identification value is a waveform of the wireless signal extracted from the wireless signal or the MAC address extracted from the data included in the wireless signal, and
   the wireless signal is a signal generated from the TPMS (Tire Pressure Monitoring System) of the vehicle.

2. The vehicle identification device of claim 1, wherein the sensor module is configured to transmit a radio wave to the vehicle, detect change in the radio wave reflected from the vehicle, and recognize the vehicle based on the change.

3. The vehicle identification device of claim 1, wherein the sensor module includes at least one of a magnetometer sensor, a loop coil sensor, an ultrasonic sensor, a microwave sensor, a radar sensor, a lidar sensor, an optical blocking type sensor, and a grid type sensor.

4. The vehicle identification device of claim 1, wherein the control unit is configured to compare a previously captured image and a currently captured image using the camera with each other, to determine a size, an area, a color, and a specific shape of a change in the image based on the comparing result, and to recognize the vehicle based on the determination result.

5. The vehicle identification device of claim 1, wherein the sensor module is configured to transmit visible light and infrared light toward the vehicle, to detect deformation including a bending, a gap, and a size of a shape (a point, a line, and a shape) of a shadow generated thereby and the transmitting light, and to recognize the vehicle based on the detection result.

6. The vehicle identification device of claim 1, wherein the control unit is configured to recognize an object from an image captured by the camera via an artificial intelligence processing unit built in the camera, and to recognize the vehicle based on the recognizing result.

7. The vehicle identification device of claim 1, wherein an appearance of the vehicle includes at least one of an exterior color, an interior color, a black box appearance, a headlight design, a taillight design, an emergency light flickering interval, a glass production year, a wheel design, a grill design, and a vehicle emblem.

8. A vehicle identification method via data and wireless signal analysis, the method comprising:

recognizing, by a vehicle identification device, a vehicle, or imaging, by the vehicle identification device, an appearance of the vehicle;

analyzing, by the vehicle identification device, sensed data or a captured image to extract a first identification value;

receiving, by the vehicle identification device, a wireless signal transmitted from a wireless radio wave transmitter installed or mounted on the vehicle;

analyzing, by the vehicle identification device, the wireless signal to extract a second identification value; and identifying, by the vehicle identification device, the vehicle based on the first identification value and the second identification value, wherein the first identification value is at least one of vehicle number, a license plate, an appearance of the vehicle and a vehicle type, the second identification value is a waveform of the wireless signal extracted from the wireless signal or the MAC address extracted from the data included in the wireless signal, and the wireless signal is a signal generated from the TPMS (Tire Pressure Monitoring System) of the vehicle.

9. The vehicle identification method of claim 8, wherein recognizing, by the vehicle identification device, the vehicle includes transmitting, by the vehicle identification device, a radio wave to the vehicle, detecting, by the vehicle identification device, change in the radio wave reflected from the vehicle, and recognizing, by the vehicle identification device, the vehicle based on the change.

10. The vehicle identification method of claim 8, wherein recognizing, by the vehicle identification device, the vehicle includes comparing, by the vehicle identification device, a previously captured image and a currently captured image with each other, determining, by the vehicle identification device, a size, an area, a color, and a specific shape of a change in the image based on the comparing result, and recognizing, by the vehicle identification device, the vehicle based on the determination result.

11. The vehicle identification method of claim 8, wherein recognizing, by the vehicle identification device, the vehicle includes transmitting, by the vehicle identification device, visible light and infrared light toward the vehicle, detecting, by the vehicle identification device, deformation including a bending, a gap, and a size of a shape (a point, a line, and a shape) of a shadow generated thereby and the transmitting light, and recognizing, by the vehicle identification device, the vehicle based on the detection result.

12. The vehicle identification method of claim 8, wherein receiving, by the vehicle identification device, the wireless signal includes:

transmitting, by the vehicle identification device, a wake-up signal for waking up a wireless communication device to the wireless communication device; and receiving, by the vehicle identification device, the wireless signal in response to the wake-up signal from the wireless communication device.

13. The vehicle identification method of claim 8, wherein receiving, by the vehicle identification device, the wireless signal includes receiving, by the vehicle identification device, the wireless signal broadcasted from a wireless communication device.

14. The vehicle identification method of claim 8, wherein receiving, by the vehicle identification device, the wireless signal includes:

broadcasting, by the vehicle identification device, a signal for communication; and receiving, by the vehicle identification device, probe information as the wireless signal in response to the broadcast signal.

* * * * *